United States Patent
Mann et al.

(10) Patent No.: US 9,819,550 B2
(45) Date of Patent: Nov. 14, 2017

(54) DIAMETER ROUTING AGENT APPLICATION PLUG-IN FRAMEWORK

(71) Applicant: ALCATEL-LUCENT CANADA, INC., Ottawa (CA)

(72) Inventors: Robert A. Mann, Carp (CA); Peter K. Jorgensen, Nepean (CA); Mike Vihtari, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 492 days.

(21) Appl. No.: 14/593,448

(22) Filed: Jan. 9, 2015

(65) Prior Publication Data
US 2016/0204985 A1    Jul. 14, 2016

(51) Int. Cl.
*H04L 12/24*    (2006.01)
*H04W 4/24*    (2009.01)
*H04L 29/08*    (2006.01)

(52) U.S. Cl.
CPC .......... *H04L 41/0893* (2013.01); *H04W 4/24* (2013.01)

(58) Field of Classification Search
CPC .............. H04L 67/327; H04L 67/1036; H04L 67/1078; H04L 67/1097; H04L 67/28; H04L 12/1407; H04L 47/12; H04L 63/0892; H04L 41/0893; H04W 24/08; H04W 4/24
USPC .......................................... 709/223; 370/252
See application file for complete search history.

(56) References Cited

U.S. PATENT DOCUMENTS

| | | | | |
|---|---|---|---|---|
| 7,957,403 | B2 * | 6/2011 | Jansson | H04L 12/1859 370/352 |
| 9,160,797 | B2 * | 10/2015 | McDysan | H04L 67/1095 |
| 2009/0109845 | A1 * | 4/2009 | Andreasen | H04L 41/0893 370/230 |
| 2010/0278046 | A1 * | 11/2010 | Mateos Perez | H04L 45/12 370/235 |
| 2011/0158090 | A1 * | 6/2011 | Riley | H04L 12/14 370/230 |
| 2011/0173107 | A1 * | 7/2011 | Rajasekar | G06Q 30/04 705/34 |
| 2012/0191847 | A1 * | 7/2012 | Nas | H04L 63/0227 709/224 |
| 2012/0276867 | A1 * | 11/2012 | Mcnamee | H04L 12/1407 455/406 |
| 2013/0039176 | A1 * | 2/2013 | Kanode | H04L 43/16 370/230 |

(Continued)

OTHER PUBLICATIONS

Barbir et al. "Requirements for an OPES Service Personalization Callout Server," OPES Working Group, Internet Draft, Jul. 2002.*

(Continued)

*Primary Examiner* — Alina N Boutah
(74) *Attorney, Agent, or Firm* — Kramer & Amado, P.C.

(57) ABSTRACT

Various exemplary embodiments relate to a method, network node, and machine-readable medium including one or more of the following: instructions for processing a received Diameter message according to a plurality of proxylets; and instructions for defining a plug-in framework as a proxylet of the plurality of proxylets, including: instructions for retrieving a plug-in chain identifying a sequence of plug-ins; instructions for determining a current plug-in based on the plug-in chain; and instructions for evaluating plug-in instructions associated with a current plug-in.

20 Claims, 6 Drawing Sheets

(56) References Cited

U.S. PATENT DOCUMENTS

| | | | | |
|---|---|---|---|---|
| 2015/0063130 A1* | 3/2015 | Vihtari | ................ | H04L 67/1097 |
| | | | | 370/252 |
| 2015/0085663 A1* | 3/2015 | McMurry | ............. | H04L 47/127 |
| | | | | 370/236 |
| 2015/0319267 A1* | 11/2015 | Donovan | ............ | H04L 63/0892 |
| | | | | 709/203 |
| 2016/0277534 A1* | 9/2016 | Mann | ...................... | H04L 45/22 |
| 2017/0126790 A1* | 5/2017 | Mortsolf | ............. | H04L 67/1002 |
| 2017/0134522 A1* | 5/2017 | Mann | .................... | H04L 67/327 |
| 2017/0164200 A1* | 6/2017 | Naslund | ................ | H04L 9/3242 |

OTHER PUBLICATIONS

Tomlinson et al. "Extensible Proxy Services Framework," Internet Working Group Internet Draft, Jan. 11, 2001.*

* cited by examiner

DIAMETER ROUTING AGENT APPLICATION PLUG-IN FRAMEWORK

TECHNICAL FIELD

Various exemplary embodiments disclosed herein relate generally to message processing and, more particularly but not exclusively, to processing of Diameter messages by a Diameter Routing Agent.

BACKGROUND

Since its proposal in Internet Engineering Task Force (IETF) Request for Comments (RFC) 3588, the Diameter protocol has been increasingly adopted by numerous networked applications. For example, the Third Generation Partnership Project (3GPP) has adopted Diameter for various policy and charging control (PCC), mobility management, and IP multimedia subsystem (IMS) applications. As IP-based networks replace circuit-switched networks, Diameter is even replacing SS7 as the key communications signaling protocol. As networks evolve, Diameter is becoming a widely used protocol among wireless and wireline communications networks.

One significant aspect of the Diameter protocol is Diameter packet routing. Entities referred to as Diameter routing agents (DRAs) facilitate movement of packets in a network. In various deployments, DRAs may perform elementary functions such as simple routing, proxying, and redirect.

SUMMARY

A brief summary of various exemplary embodiments is presented below. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a non-transitory machine-readable storage medium encoded with instructions for execution by a Diameter device, the non-transitory machine-readable storage medium including: instructions for processing a received Diameter message according to a plurality of proxylets; and instructions for defining a plug-in framework as a proxylet of the plurality of proxylets, including: instructions for retrieving a plug-in chain identifying a sequence of plug-ins; instructions for determining a current plug-in based on the plug-in chain; and instructions for evaluating plug-in instructions associated with a current plug-in.

Various exemplary embodiments relate to a Diameter device including: a network interface; a storage including: a plurality of proxylets, including a plug-in framework proxylet, a plurality of plug-ins, and at least one plug-in chain identifying a sequence of plug-ins; and a processor in communication with the network interface and storage, the processor being configured to: process a received Diameter message according to the plurality of proxylets; and in executing the plug-in framework proxylet: retrieve a plug-in chain of the at least one plug-in chain; determine a current plug-in based on the plug-in chain; and evaluate the current plug-in.

Various exemplary embodiments relate to a method performed by a Diameter device, the method including: processing a received Diameter message according to a plurality of proxylets; and providing a plug-in framework as a proxylet of the plurality of proxylets, including: retrieving a plug-in chain identifying a sequence of plug-ins; instructions for determining a current plug-in based on the plug-in chain; and evaluating plug-in instructions associated with a current plug-in.

Various embodiments additionally include instructions for receiving a plug-in result code based on evaluating plug-in instructions, wherein the instructions for determining a current plug-in are further based on a previously-received plug-in result code.

Various embodiments are described wherein the instructions for determining a current plug-in include: instructions for determining that a most recently evaluated plug-in is the current plug-in based on a first plug-in result code; instructions for determining that a next plug-in in the sequence of plug-ins in the current plug-in based on a second plug-in result code; and instructions for determining that a previous plug-in occurring before the most recently evaluated plug-in in the sequence of plug-ins is the current plug-in based on a third plug-in result code.

Various embodiments are described wherein the instructions for determining a current plug-in include: instructions for determining that a plug-in identified by the sequence of plug-ins as the first plug-in of the sequence is the current plug-in based on a first plug-in result code.

Various embodiments are described wherein the instructions for determining a current plug-in include instructions for determining that no additional plug-ins remain to be evaluated based on a first plug-in result code, whereby any remaining plug-ins in the plug-in chain are skipped.

Various embodiments are described wherein: the instructions for retrieving a plug-in chain identifying a sequence of plug-ins include: instructions for retrieving a first plug-in chain when the received Diameter message is a Diameter request message, and instructions for retrieving a second plug-in chain when the received Diameter message is a Diameter response message.

Various embodiments are described wherein the instructions for determining a current plug-in include: instructions for, based on receiving a first plug-in result code, determining the current plug-in based on an opposite plug-in chain of the first plug-in chain and the second plug-in chain, wherein the opposite plug-in chain is different from the plug-in chain initially selected for processing the received Diameter message by the instructions for retrieving a plug-in chain identifying a sequence of plug-ins.

Various embodiments are described wherein the instructions for defining a plug-in framework further include: instructions for indicating to the instructions for processing a received Diameter message according to a plurality of proxylets that no further proxylets are to be processed for the received Diameter message based on receiving a first plug-in result code.

Various embodiments are described wherein the instructions for defining a plug-in framework further include: instructions for establishing at least one thread pool for executing tasks on behalf of plug-ins.

Various embodiments additionally include instructions for suspending execution of the plug-in framework for a received Diameter message based on receiving a first plug-in result code; and instructions for resuming execution of the plug-in framework for the received Diameter message based on receiving an indication from the at least one thread pool that execution is to resume.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure or substantially the same or similar function.

DETAILED DESCRIPTION

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Diameter Routing Agents (DRAs) available today provide only basic functionalities typically defined in hard coding or scripting. As such, users may typically not be empowered to easily and flexibly define more complex behaviors for a DRA. In view of the foregoing, it would be desirable to provide a method and system that facilitates user definition and extension of DRA message processing behavior. Additionally, it would be desirable to generally extend such methods and systems beyond DRA devices into other devices including other Diameter devices.

Figure 1:
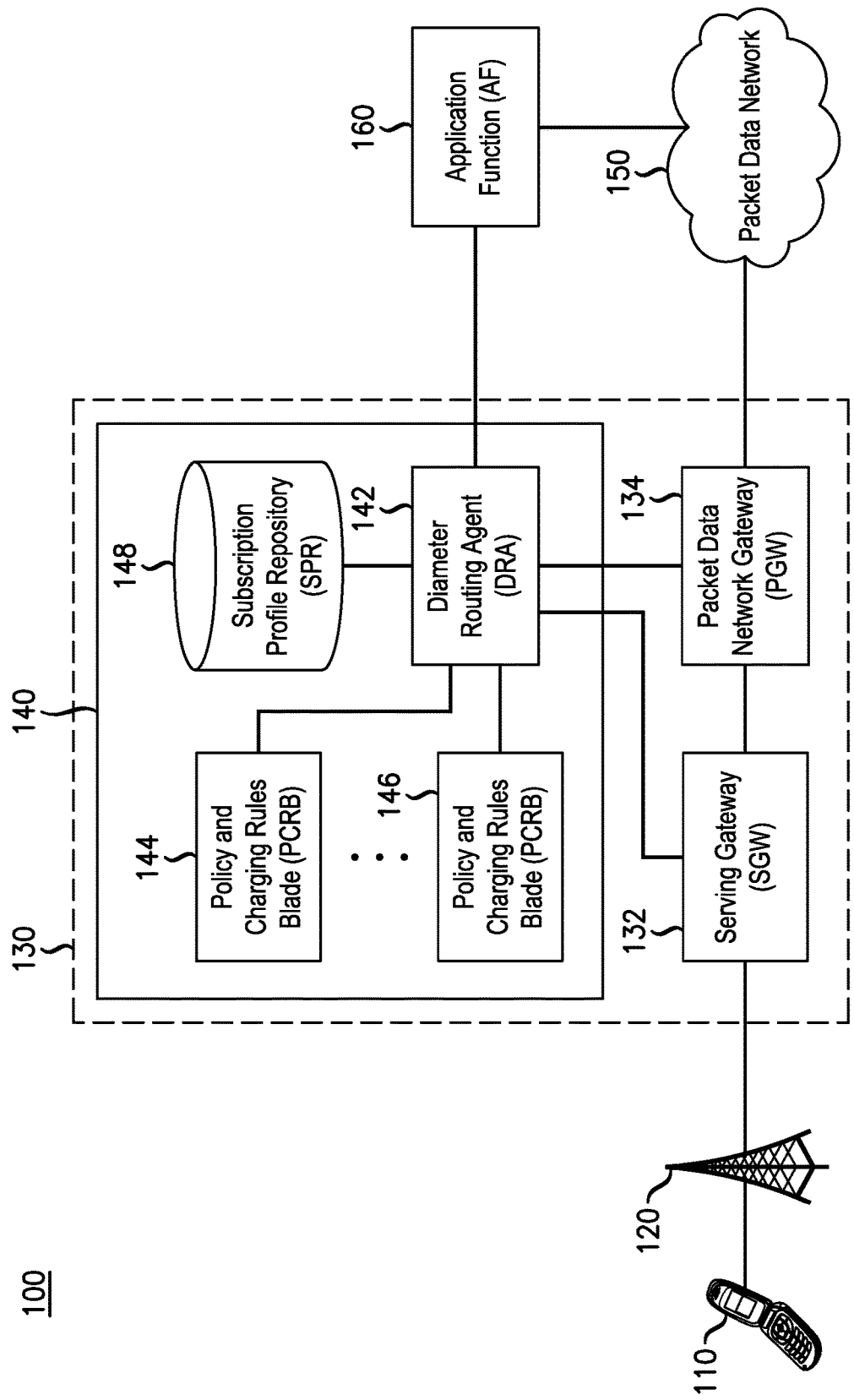
FIG. 1 illustrates an exemplary network environment for a Diameter Routing Agent.

FIG. 1 illustrates an exemplary network environment 100 for a Diameter Routing Agent (DRA) 142. Exemplary network environment 100 may be a subscriber network for providing various services. In various embodiments, subscriber network 100 may be a public land mobile network (PLMN). Exemplary subscriber network 100 may be telecommunications network or other network for providing access to various services. Exemplary subscriber network 100 may include user equipment 110, base station 120, evolved packet core (EPC) 130, packet data network 150, and application function (AF) 160.

User equipment 110 may be a device that communicates with packet data network 150 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, tablet, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by the relevant 3GPP standards. Thus, base station 120 may be a device that communicates with user equipment 110 via a first medium, such as radio waves, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with EPC 130. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the relevant 3GPP standards. EPC 130 may include a serving gateway (SGW) 132, a packet data network gateway (PGW) 134, and a session control device 140.

Serving gateway (SGW) 132 may be a device that provides gateway access to the EPC 130. SGW 132 may be one of the first devices within the EPC 130 that receives packets sent by user equipment 110. Various embodiments may also include a mobility management entity (MME) (not shown) that receives packets prior to SGW 132. SGW 132 may forward such packets toward PGW 134. SGW 132 may perform a number of functions such as, for example, managing mobility of user equipment 110 between multiple base stations (not shown) and enforcing particular quality of service (QoS) characteristics for each flow being served. In various implementations, such as those implementing the Proxy Mobile IP standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Therefore, PGW 134 may be a policy and charging enforcement node (PCEN). PGW 134 may include a number of additional features such as, for example, packet filtering, deep packet inspection, and subscriber charging support. PGW 134 may also be responsible for requesting resource allocation for unknown application services.

Session control device 140 may be a device that provides various management or other functions within the EPC 130. For example, session control device 140 may provide a Policy and Charging Rules Function (PCRF). In various embodiments, session control device 140 may include an Alcatel Lucent 5780 Dynamic Services Controller (DSC). Session control device 140 may include a DRA 142, a plurality of policy and charging rules blades (PCRBs) 144, 146, and a subscriber profile repository.

In various embodiments, DRA 142 may be an intelligent Diameter Routing Agent. As such, DRA 142 may receive, process, and transmit various Diameter messages. DRA 142 may include a number of user-defined rules that govern the behavior of DRA 142 with regard to the various Diameter messages DRA 142 may encounter. Based on such rules, the DRA 142 may operate as a relay agent, proxy agent, or redirect agent. For example, DRA 142 may relay received messages to an appropriate recipient device. Such routing may be performed with respect to incoming and outgoing messages, as well as messages that are internal to the session control device.

Policy and charging rules blades (PCRB) 144, 146 may each be a device or group of devices that receives requests for application services, generates PCC rules, and provides PCC rules to the PGW 134 or other PCENs (not shown). PCRBs 144, 146 may be in communication with AF 160 via an Rx interface. As described in further detail below with respect to AF 160, PCRB 144, 146 may receive an application request in the form of an Authentication and Authorization Request (AAR) from AF 160. Upon receipt of an AAR, PCRB 144, 146 may generate at least one new PCC rule for fulfilling the application request.

PCRB 144, 146 may also be in communication with SGW 132 and PGW 134 via a Gxx and a Gx interface, respectively. PCRB 144, 146 may receive an application request in the form of a credit control request (CCR) from SGW 132 or PGW 134. As with an AAR, upon receipt of a CCR, PCRB 144, 146 may generate at least one new PCC rule for fulfilling the application request. In various embodiments, the AAR and the CCR may represent two independent application requests to be processed separately, while in other embodiments, the AAR and the CCR may carry information regarding a single application request and PCRB 144, 146 may create at least one PCC rule based on the combination of the AAR and the CCR. In various embodiments, PCRB 144, 146 may be capable of handling both single-message and paired-message application requests.

Upon creating a new PCC rule or upon request by the PGW 134, PCRB 144, 146 may provide a PCC rule to PGW 134 via the Gx interface. In various embodiments, such as those implementing the proxy mobile IP (PMIP) standard for example, PCRB 144, 146 may also generate QoS rules. Upon creating a new QoS rule or upon request by the SGW 132, PCRB 144, 146 may provide a QoS rule to SGW 132 via the Gxx interface.

Subscriber profile repository (SPR) 148 may be a device that stores information related to subscribers to the subscriber network 100. Thus, SPR 148 may include a machine-readable storage medium such as read-only memory (ROM), random-access memory (RAM), magnetic disk storage media, optical storage media, flash-memory devices, and/or similar storage media. SPR 148 may be a component of one of PCRB 144, 146 or may constitute an independent node within EPC 130 or session control device 140. Data stored by SPR 148 may include subscriber information such as identifiers for each subscriber, bandwidth limits, charging parameters, and subscriber priority.

Packet data network 150 may be any network for providing data communications between user equipment 110 and other devices connected to packet data network 150, such as AF 160. Packet data network 150 may further provide, for example, phone or Internet service to various user devices in communication with packet data network 150.

Application function (AF) 160 may be a device that provides a known application service to user equipment 110. Thus, AF 160 may be a server or other device that provides, for example, a video streaming or voice communication service to user equipment 110. AF 160 may further be in communication with the PCRB 144, 146 of the EPC 130 via an Rx interface. When AF 160 is to begin providing known application service to user equipment 110, AF 160 may generate an application request message, such as an authentication and authorization request (AAR) according to the Diameter protocol, to notify the PCRB 144, 146 that resources should be allocated for the application service. This application request message may include information such as an identification of the subscriber using the application service, an IP address of the subscriber, an APN for an associated IP-CAN session, or an identification of the particular service data flows that must be established in order to provide the requested service.

As will be understood, various Diameter applications may be established within subscriber network 100 and supported by DRA 142. For example, an Rx application may be established between AF 160 and each of PCRBs 144, 146. As another example, an Sp application may be established between SPR 148 and each of PCRBs 144, 146. As yet another example, an S9 application may be established between one or more of PCRBs 144, 146 and a remote device implementing another PCRF (not shown). As will be understood, numerous other Diameter applications may be established within subscriber network 100.

In supporting the various potential Diameter applications, DRA 142 may receive Diameter messages, process the messages, and perform actions based on the processing. For example, DRA 142 may receive a Gx CCR from PGW 134, identify an appropriate PCRB 144, 146 to process the Gx CCR, and forward the Gx CCR to the identified PCRB 144, 146. DRA 142 may also act as a proxy by modifying the subsequent Gx CCA sent by the PCRB 144, 146 to carry an origin-host identification pointing to the DRA 142 instead of the PCRB 144, 146. Additionally or alternatively, DRA 142 may act as a redirect agent or otherwise respond directly to a request message by forming an appropriate answer message and transmitting the answer message to an appropriate requesting device.

According to various embodiments, one or more devices within the network may be provided with an application plug-in framework, capable of providing operators with the ability to flexibly define the processing that should be performed for received messages. For example, the DRA 142 and PCRBs 144, 146 may be provided with Diameter implementations that call out to such a plug-in framework. Various alternative devices for implementing a plug-in framework will be apparent. Various embodiments will be described herein with respect to a DRA; however, it will be understood that the methods and systems described may be implemented in other types of devices.

Figure 2:
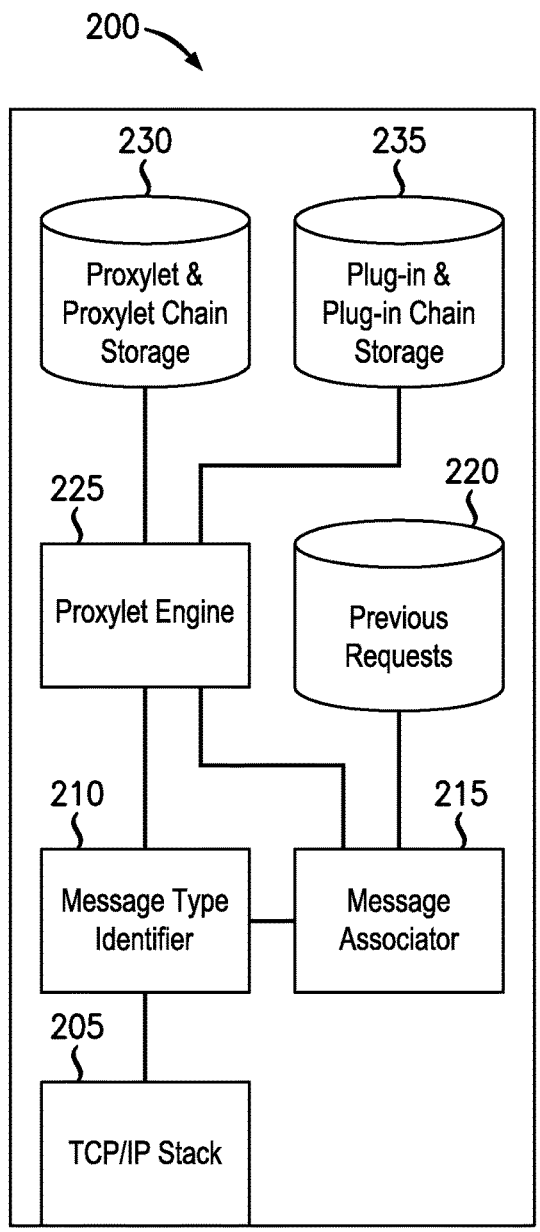
FIG. 2 illustrates an exemplary Diameter Routing Agent.

FIG. 2 illustrates an exemplary Diameter Routing Agent 200. The DRA 200 may correspond to the DRA 142 of the exemplary network 100 and is supported by various hardware, as will be explained in greater detail below. Various components of the DRA 200 may be taken as representative of a Diameter stack; however, various alternative and additional components for implementing a Diameter stack will be apparent and may be implemented though not shown. As shown, the DRA 200 includes a TCP/IP stack 205, message type identifier 210, message associator 215, previous requests storage 220, proxylet engine 225, proxylet & proxylet chain storage 230, and plug-in & plug-in chain storage 235.

The TCP/IP stack 205 may be any implementation of the TCP/IP protocols and any additional protocols that may be appropriate. For example, the TCP/IP stack 205 may additionally implement Ethernet or WiFi protocols. As such, the TCP/IP stack may exchange messages between the components of the DRA 200 and other networked devices (not shown). For example, upon receiving a frame from another device, the TCP/IP stack may perform functions associated with the various protocols such as removing frame, packet, and segment headers prior to passing the message to the message type identifier 210. Similarly, upon receiving an outgoing message, the TCP/IP stack may add appropriate headers prior to transmission.

The message type identifier 210 includes hardware and machine-readable instructions configured to determine, for a received Diameter message, whether the message is a request or response message. As will be understood, the Diameter protocol revolves around pairs of messages; generally, each response message is associated with a prior request message. For example, by inspecting the Diameter header command code field, the message type identifier 210 may determine whether a received Diameter message corresponds to one of the request message types (e.g., CCR, AAR, RAR) or one of the response message types (e.g., CCA, AAA, RAA). If the message corresponds to a request, the message type identifier 210 passes the message directly to the proxylet engine. Otherwise, if the message corresponds to a response, the message type identifier 210 passes the message first to the message associator 215.

The message associator 215 includes hardware and machine-readable instructions configured to locate a previous request associated with a received response message within the previous requests storage 220. For example, by examining header fields of the response message, the message associator 215 may search the previous requests storage 220 for a matching request message. Various alternative methods for correlating request and response messages will be apparent. After locating the corresponding request, the message associator 215 passes control to the proxylet engine.

The proxylet engine 225 includes hardware and machine-readable instructions configured to traverse a proxylet chain by invoking proxylets based on the order specified in the chain. Such proxylets may be defined to accomplish various functions. For example, proxylets may be defined to parse Diameter message header fields, locate appropriate peers to which a message will be transmitted, or transmit messages via the TCP/IP stack 205. In some embodiments, the message associator 215 may be implemented as a proxylet. In some embodiments, different proxylet chains may be defined for response messages and request messages; as such, the proxylet engine may begin by selecting an appropriate proxylet chain from the proxylet storage 230 based on the type of received message. In various embodiments, the proxylet engine 235 may be implemented as part of a general Diameter protocol implementation.

According to various embodiments, a proxylet in the proxylet storage 230 is defined to provide a plug-in framework. As will be described in greater detail below, the plug-in framework may traverse one or more plug-in chains by invoking each identified plug-in and then identifying a next plug-in (if any) based on the return code of the plug-in. Upon reaching the end of a plug-in chain, the proxylet engine 225 may proceed to the next proxylet. In some embodiments, various plug-in return codes may be used to indicate that the proxylet engine should move to a different point in the proxylet chain rather than simply executing the next proxylet. Plug-ins may be defined for providing various features such as, for example, a rules engine, load balancing, topology hiding, etc. In various embodiments, operators may be provided with an interface to add, delete, and modify the plug-ins stored in the plug-in storage, as well as to define the plug-in chains that will be traversed by the plug-in framework proxylet. As such, the functionality of the DRA 200 (or other device) Diameter implementation may be extended by an operator without exposing the proxylet engine 225 and proxylet storage 230 to the operator.

The various storages 220, 230, 235 may include one or more storage devices for storing data; in some embodiments, the storages 220, 230, 235 may be provided by a single physical storage device. As noted above, the previous requests storage 220 may store a record of requests previously processed by the DRA (e.g., all requests within the last 60 seconds), the proxylet storage 235 may store one or more files defining proxylets along with one or more chains indicating an intended proxylet execution order, and the plug-in storage 235 may store one or more files defining plug-ins along with one or more chains indicating an intended plug-in execution order. In various embodiments, the proxylets and plug-ins are stored as Java archive GAR) files, compiled machine code, scripts, or in other forms.

Figure 3:
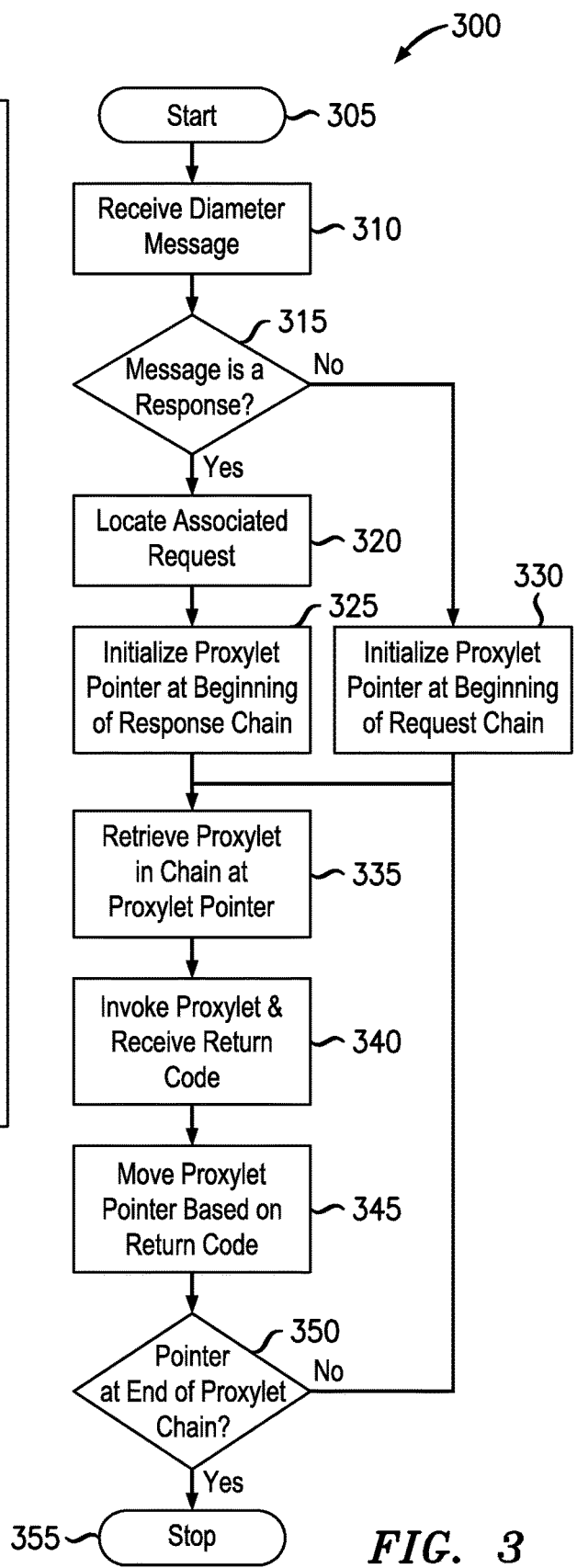
FIG. 3 illustrates an exemplary method for processing Diameter messages.

FIG. 3 illustrates an exemplary method 300 for processing Diameter messages. The method 300 may be performed by various components of a DRA or other Diameter device such as, for example, the message type identifier 210, message associator 215, or proxylet engine 225 of the exemplary DRA 200. It will be understood that the method 300 is performed by various hardware, such as the exemplary hardware that will be described in greater detail below.

The method 300 begins in step 305 and proceeds to step 310 where the Diameter device receives a Diameter message to be processed. In step 315, the Diameter device determines whether the message is a response message or a request message. For example, the Diameter device may inspect the Diameter header of the message to determine the type of message. If the message is a response message, the Diameter device locates the associated request in step 320 by, for example, comparing one or more session identifiers or other fields of the Diameter message header to a stored set of previously-processed request messages. Then, in step 325, the Diameter device locates a proxylet chain to be used in processing response messages and initializes a current pointer to the beginning of this chain. As will be understood, the pointer may be represented by, for example, an index number indicating a current position within the chain. If, on the other hand, the message is a request, the Diameter device instead initializes the pointer to the beginning of a proxylet chain defined for request messages.

After the appropriate proxylet chain has been located and the pointer has been initialized, the Diameter device begins traversing the proxylet chain in step 335 by retrieving the instructions defining the proxylet identified by the current pointer. As will be understood, the first time step 335 is executed, the pointer will point to the beginning of one of the proxylet chains (due to the initialization in step 325 or 330) and, as such, the instructions for the first proxylet identified by the applicable chain will be retrieved. Next, the Diameter device invokes the proxylet in step 340 by executing the retrieved instructions. Upon completion, the instructions return a proxylet return code, which is received in step 340.

In step 345, the Diameter device updates the pointer based on the return code. For example, in various embodiments, the Diameter device may simply increment or otherwise advance the pointer based on the fact that the return code was received. Alternatively, the return code may be interpreted to determine how the pointer should be moved. For example, the return code may take on different values to indicate (without limitation) that the pointer should return to the beginning of the proxylet chain, move to the end of the proxylet chain, move to the previous proxylet, remain on the current proxylet, or move to the next proxylet in the chian. As further examples, the return code may indicate that the pointer should be updated to point to a different proxylet chain at a particular location such as, for example, the beginning or end of the response chain or the request chain. Further modifications will be apparent.

After moving the proxylet pointer, the Diameter device then determines whether the pointer is located at the end of the current proxylet chain (taking into account whether the current proxylet chain was changed by operation of step 345). If not, the method loops back to step 335 where the proxylet now identified by the pointer will be handled. Otherwise, the method proceeds to end in step 355.

Figure 4:
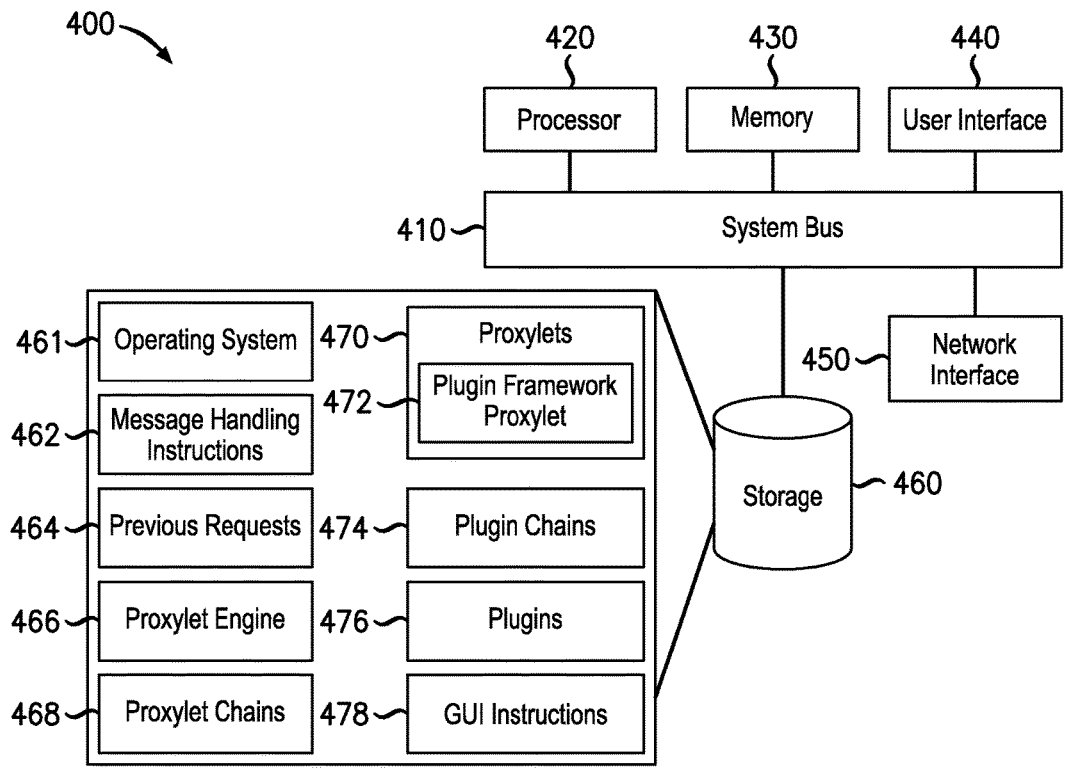
FIG. 4 illustrates an exemplary hardware diagram for implementing a Diameter Routing Agent.

FIG. 4 illustrates an exemplary hardware diagram 400 for implementing a Diameter Routing Agent. The exemplary hardware 400 may correspond to one or more devices of the exemplary network 100 or the exemplary DRA 200. As shown, the device 400 includes a processor 420, memory 430, user interface 440, network interface 450, and storage 460 interconnected via one or more system buses 410. It will be understood that FIG. 4 constitutes, in some respects, an abstraction and that the actual organization of the components of the device 400 may be more complex than illustrated.

The processor 420 may be any hardware device capable of executing instructions stored in memory 430 or storage 460 or otherwise processing data. As such, the processor may include a microprocessor, field programmable gate array (FPGA), application-specific integrated circuit (ASIC), or other similar devices.

The memory 430 may include various memories such as, for example L1, L2, or L3 cache or system memory. As such, the memory 430 may include static random access memory (SRAM), dynamic RAM (DRAM), flash memory, read only memory (ROM), or other similar memory devices.

The user interface 440 may include one or more devices for enabling communication with a user such as an administrator. For example, the user interface 440 may include a display, a mouse, and a keyboard for receiving user commands. In some embodiments, the user interface 440 may include a command line interface or graphical user interface that may be presented to a remote terminal via the network interface 450.

The network interface 450 may include one or more devices for enabling communication with other hardware devices. For example, the network interface 450 may include a network interface card (NIC) configured to communicate according to the Ethernet protocol. Additionally, the network interface 450 may implement a TCP/IP stack for communication according to the TCP/IP protocols. Various alternative or additional hardware or configurations for the network interface 450 will be apparent.

The storage 460 may include one or more machine-readable storage media such as read-only memory (ROM), random-access memory (RAM), magnetic disk storage media, optical storage media, flash-memory devices, or similar storage media. In various embodiments, the storage 460 may store instructions for execution by the processor 420 or data upon which the processor 420 may operate. For example, the storage 460 may store a base operating system 461 for controlling various basic operations of the hardware 200. As shown, the storage 460 also includes message handling instructions 462 for identifying message types and, when appropriate, locating an associated request from the stored previous requests 464. In various embodiments, the message handling instructions may alternatively constitute one of the proxylets 470.

The storage 466 also includes proxylet engine instructions 466 for traversing one or more proxylet chains 468 and invoking one or more sets of proxylet instructions 470 accordingly such as, for example, as described with respect to the exemplary method 300. The proxylet instructions 470 include plug-in framework proxylet instructions 472 that traverse one or more plug-in chains 474 and executing plug-in instructions 476 accordingly, as will be described in greater detail below. The storage 460 may also include GUI instructions 478 for presenting a GUI to an operator via the user interface 440 or network interface 450 for modifying the plug-in chains 474 or plug-in instructions 476 and thereby alter the behavior of the hardware when the plug-in framework proxylet instructions are executed.

It will be apparent that various information described as stored in the storage 460 may be additionally or alternatively stored in the memory 430. In this respect, the memory 430 may also be considered to constitute a "storage device" and the storage 460 may be considered a "memory." Various other arrangements will be apparent. Further, the memory 430 and storage 460 may both be considered to be "non-transitory machine-readable media." As used herein, the term "non-transitory" will be understood to exclude transitory signals but to include all forms of storage, including both volatile and non-volatile memories.

While the host device 400 is shown as including one of each described component, the various components may be duplicated in various embodiments. For example, the processor 420 may include multiple microprocessors that are configured to independently execute the methods described herein or are configured to perform steps or subroutines of the methods described herein such that the multiple processors cooperate to achieve the functionality described herein. Further, where the device 400 is implemented in a cloud computing system, the various hardware components may belong to separate physical systems. For example, the processor 420 may include a first processor in a first server and a second processor in a second server.

Figure 5:
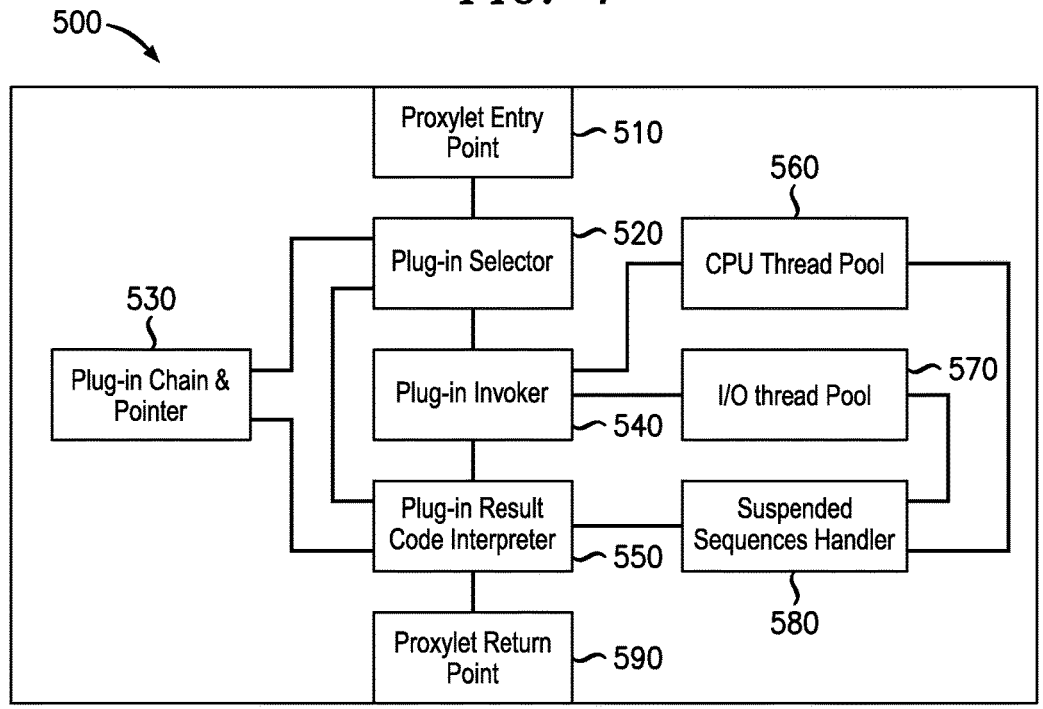
FIG. 5 illustrates an exemplary block diagram for implementing a plug-in framework.

FIG. 5 illustrates an exemplary block diagram 500 for implementing a plug-in framework. The block diagram 500 may correspond, for example, to the plug-in framework proxylet 472 of the exemplary hardware 400. It will be understood that the various modules of the plug-in framework 500 are implemented at least in part by hardware, such as the hardware of the exemplary hardware 400.

As shown, the plug-in framework 500 includes a proxylet entry point 510 where operations will begin upon invocation of the plug-in framework 500 by an underlying proxylet engine (such as, for example, the proxylet engine 225 of the exemplary DRA 200 or the proxylet engine instructions 466 of the exemplary hardware 400). After invocation, a plug-in selector 520 utilizes a plug-in chain and pointer thereto to determine the next plug-in to be invoked. As such, the initial operation of the plug-in selector 520 will select the first plug-in in the plug-in chain because the pointer will carry its initialized value pointing to the beginning of the plug-in chain. Next, a plug-in invoker 540 locates and executes the instructions corresponding to the selected plug-in. For example, where the plug-in is defined by a JAR file, the plug-in invoker retrieves the JAR file and provides it to the Java runtime environment for interpretation and execution. When the plug-in finishes execution, it returns a plug-in result code which is received by a plug-in result code interpreter 550. The plug-in result code interpreter 550 updates the pointer 530 based on the result code received. Various exemplary result codes and effects on the plug-in pointer and plug-in chain will be described in greater detail below. The plug-in result code interpreter 550 also determines whether the plug-in pointer is now at the end of the plug-in chain 530 or if proxylet execution should otherwise end. If not, the plug-in result code interpreter 550 passes control back to the plug-in selector 520 to handle the next plug-in. Otherwise, control is passed to the proxylet return point 590 where a proxylet return code is returned to the proxylet engine.

The plug-in framework 500 additionally provides two thread pools 560, 570 for use by the plug-ins in performing various supplemental or ancillary tasks aside from the main thread executed by the plug-in invoker 540. As will be understood, the threads in the CPU thread pool 560 may be configured and set aside for CPU-bound processes (e.g., faster or synchronous processes) while the I/O thread pool 570 may be configured and set aside for IO-bound processes (e.g., slower or asynchronous processes). For example, a plug-in may offload processing-intensive tasks to the CPU thread pool 560 as one or more processing threads. Similarly, a plug-in may offload tasks that wait for input from an external device such as a subscriber record database or other asynchronous operations to the I/O thread pool 570. Upon completion when the main thread of the plug-in is still active, the threads designated to one of the thread pools 560, 570 will return a result to the plug-in.

In some embodiments, prior to invocation of a plug-in, the framework may call a function of the plug-in to give the plug-in the option of processing or not processing the message. For example, each plug-in may be implemented with a "handleResponse" or "handleRequest" function which returns a plug-in handling result code indicating whether the plug-in wishes to process the message. For example, if a plug-in returns a handling result code of "PASS," the plug-in framework may simply move on to the next plug-in. If a plug-in returns a handling result code of "ACCEPT," the plug-in framework may proceed by calling a "processResponse" or "processRequest" function implemented by the plug-in to invoke the main plug-in functionality. In some embodiments, the plug-in may be given the ability to control the type of thread to which the plug-in framework and plug-in execution is bound. For example, upon receiving an "ACCEPT" handling result code, the plug-in framework may, if not already, switch execution to a thread from the CPU thread pool 560. Upon receiving an "ACCEPT-MAY-BLOCK" handling result code, the plug-in framework may, if not already, switch execution to a thread from the I/O thread pool 570. As a further example, upon receiving a "SAME" handling result code, the plug-in framework may call the same handling function again to receive a new handling result code for further interpretation.

The plug-in framework 500 also provides for the ability to suspend execution of a plug-in for a period of time. For example, to free system resources while awaiting a result from one or more tasks designated to the CPU thread pool 560 or the I/O thread pool 570, a plug-in may return a result code indicating that execution of the plug-in framework for the current message should be suspended. The plug-in result code interpreter 550 would then indicate to a suspended sequences handler 580 that the current sequence is suspended. The suspended sequences handler 580 then waits for an indication from the CPU thread pool 560 or I/O thread pool 570 that the threads associated with the sequence have completed and then return control to the plug-in result code interpreter 550. In some embodiments, the indication from the CPU thread pool 560 or I/O thread pool 570 may include a result code for interpretation by the plug-in result code interpreter. For example, the indication from the CPU thread pool 560 or I/O thread pool 570 may instruct the plug-in result code interpreter 550 to leave the pointer alone (and thereby cause the plug-in selector to reexecute the same plug-in) or to advance the pointer to the next plug-in in the plug-in chain. Various additional result codes for receipt from the CPU thread pool 560 or I/O thread pool 570 will be apparent. Alternatively, the suspend result code received from the plug-in itself may carry a further indication as to how the pointer should be modified (if at all) after resuming execution of the sequence.

Figure 6:
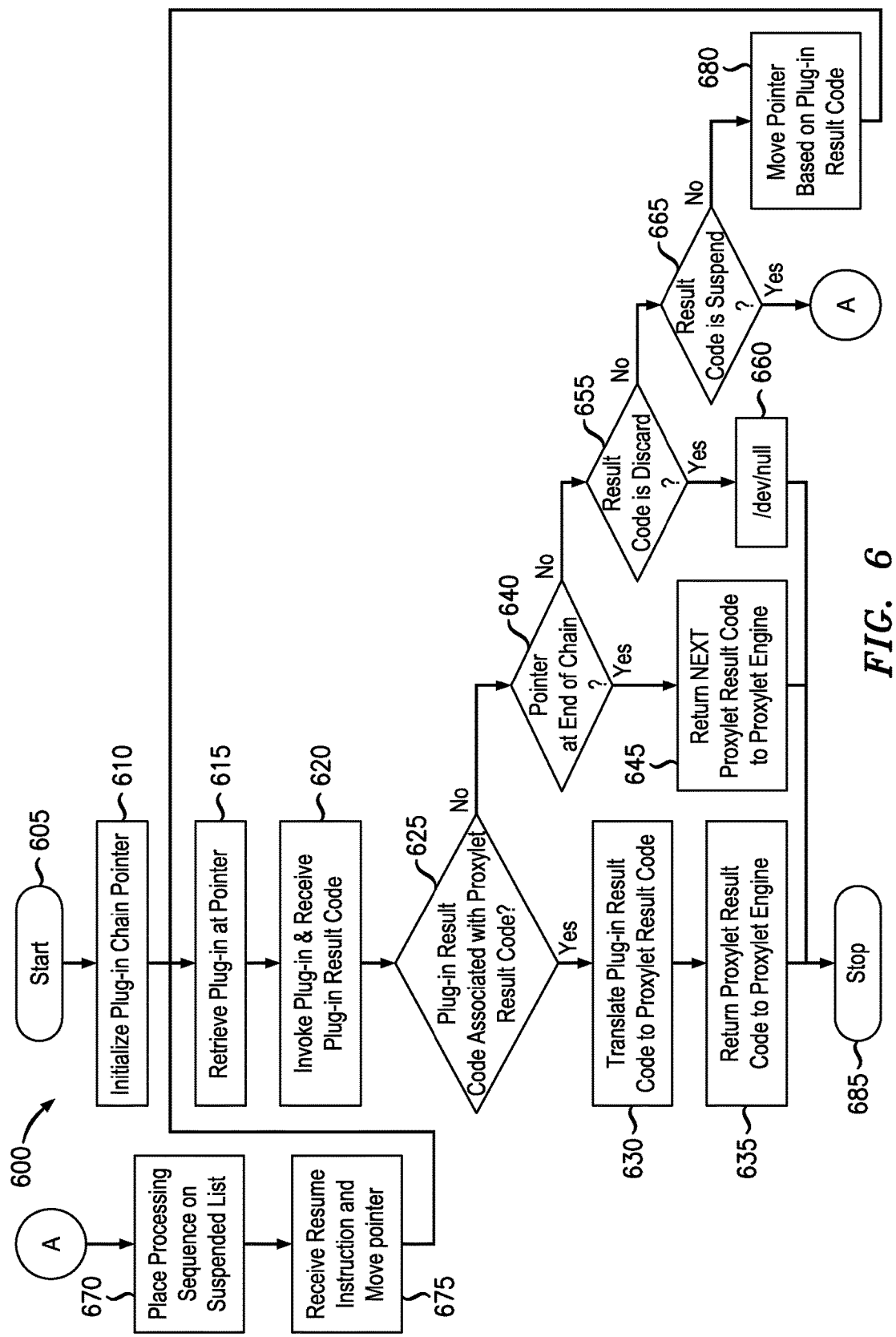
FIG. 6 illustrates an exemplary method for executing a plug-in framework.

FIG. 6 illustrates an exemplary method 600 for executing a plug-in framework. The method 600 is executed by a processor and may correspond to the plug-in framework proxylet 472 of the exemplary hardware 400 or the plug-in framework 500.

The method 600 begins in step 605 and proceeds to step 610 where the processor initializes the plug-in chain pointer to point to the beginning of the appropriate plug-in chain. For example, where the message being processed is a request message, the processor initializes the pointer to point to the beginning of the request plug-in chain; likewise, when the message is a response, the processor initializes the pointer to point to the beginning of the response plug-in chain.

Next, in step 615, the processor retrieves the instructions for the plug-in currently identified by the pointer and, in step 620, initiates execution of the retrieved instructions. As previously explained, the execution of the instructions may include one or more instructions back to the framework to allocate one or more CPU or I/O threads for the plug-in to use. When the plug-in returns control to the framework, it passes back a result code to be interpreted by the framework.

The processor begins interpreting the plug-in result code in step 625 by determining whether the plug-in result code is associated with a proxylet result code. For example, the plug-in framework may have one or more plug-in result codes designated as not only ending the current execution of a plug-in sequence but as also designating an instruction to send back to the proxylet engine other than a standard "next" proxylet result code. For example, a plug-in may indicate, via a result code, that the plug-in framework should instruct the proxylet engine to move directly to the beginning or the end of the current proxylet chain or to the beginning or the end of a different proxylet chain. Additional possibilities will be apparent. If the plug-in result code is associated with a proxylet result code, the processor translates to the proxylet result code in step 630. For example, the processor may simply retrieve the appropriate proxylet result code from a table or other structure correlating the plug-in result code to the proxylet result code. Then, the processor returns the proxylet result code to the proxylet engine in step 635 and the method 600 ends in step 685.

If, on the other hand, the plug-in result code does not correspond to a proxylet response code, the method 600 moves to step 640 where the processor determines whether the pointer is now at the end of the chain. If so, the processor returns a NEXT proxylet result code to the proxylet engine (indicating that the next proxylet should be evaluated) and the method ends in step 685.

If the pointer is not at the end of the chain, the method 600 proceeds to step 655 where the processor determines whether the result code indicates that the message should be discarded. If so, the processor drops the message by, for example, writing to the /dev/null device file, thereby indicating to the proxylet engine that no further processing is necessary.

If the pointer does not indicate that the message should be discarded, the method 600 proceeds to step 665 where the processor determines whether the plug-in result code indicates that the plug-in framework should be suspended for the current message. If so, the method 600 proceeds to step 670 where the processor places the current sequence on the list of suspended sequences or otherwise effects suspension of the sequence. For example, the processor may save an image or otherwise save the current state and then free resources for use by other processes. In some embodiments, the suspend and resume functionality may be provided by an underlying Diameter implementation. The processor then waits for some indication that the processing should be resumed such as, for example, an indication from a thread in the CPU or I/O thread pool. Upon receiving such an indication, the processor resumes execution (by, for example, reconstructing the processing state from a previously saved image or other state representation) and moves the pointer (if appropriate) in step 675 and the method loops back to step 615.

If, on the other hand, the plug-in result code does not indicate that processing should be suspended, the processor moves the pointer based on the result code in step 680. For example, if the plug-in result code indicates "NEXT," the processor advances the pointer or if the plug-in result code indicates "SAME," the processor leaves the pointer at its current value. The method 600 then loops back to step 615.

It will be apparent that various alternative methods may be used and that the steps of the exemplary method 600 may be reordered. For example, steps 640 and 645 may be moved to the "no" branch exiting step 665 so that the "no response" and "suspend" return codes are evaluated even when the pointer has reached the end of the chain. Various additional modifications will be apparent.

Figure 7:
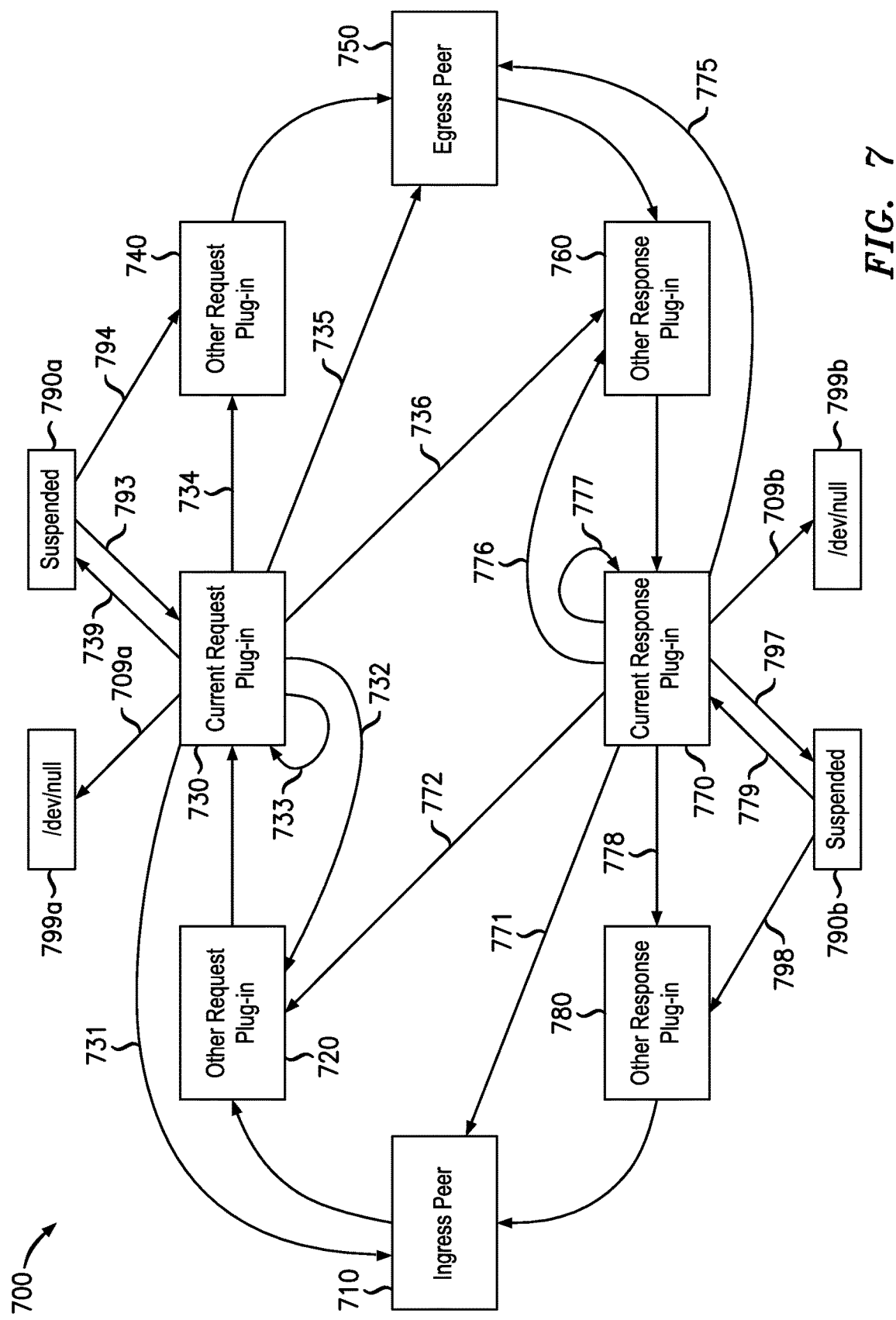
FIG. 7 illustrates an exemplary state diagram illustrating exemplary plug-in result codes.

FIG. 7 illustrates an exemplary state diagram 700 illustrating exemplary plug-in result codes. As shown, the state diagram includes two processing sequences. A request path extends from an ingress peer 710 (e.g., the previous proxylet on the request proxylet chain) through one or more request plug-ins 720, 730, 740, to an egress peer 750 (e.g., the next proxylet on the request proxylet chain). A response path extends in generally the opposite direction from the egress peer (e.g., the previous proxylet on the response proxylet chain), through one or more response plug-ins 760, 770, 780, to the ingress peer 710 (e.g., the next proxylet on the response proxylet chain). As shown, both paths include three plug-ins: a "current plug-in" 730, 770 surrounded by "other plug-ins" 720, 740, 760, 780 to illustrate the effects that various plug-in result codes will have coming from the "current plug-ins" 730, 770. It will be understood that the request and response chains may be provided with greater or fewer number of plug-ins and that the "other plug-ins" 720, 740, 760, 780 may return the same plug-in result codes with effect similar to those described herein.

As a first example, a "NEXT" plug-in return code indicates that the pointer should be moved to the next plug-in in the current plug-in chain (or to the end of the chain if no additional plug-ins remain in the current plug-in chain). Thus, if the current request plug-in 730 returns a "NEXT" return code, the pointer will follow transition 734 to the following request plug-in 740. Similarly, if the current response plug-in 770 returns a "NEXT" return code, the pointer will follow transition 778 to the following response plug-in 780.

As another example, a "SAME" plug-in return code indicates that the pointer should not be moved. As such, upon returning the "SAME" plug-in return code, control would remain with the current request plug-in 730 via transition 733 or with the current response plug-in via transition 777, dependent on which of these plug-ins 730, 770 returned the return code.

In the exemplary diagram 700, a "FIRST" return code indicates that the pointer should be moved backward to the plug-in at the beginning of the current chain (which may have been previously executed at least once before). For example, as shown, if the current request plug-in 730 returned a "FIRST" return code, the pointer would follow transition 732 back to the previous plug-in 720 in the request chain. Likewise, if the current response plug-in 770 returned the "FIRST" return code, the pointer would follow transition 776 back to the previous plug-in 760 in the response chain.

Plug-in return codes may also be used by a plug-in to indicate that no further plug-in processing within the plug-in framework should be performed. For example, a "LAST" return code may indicate that the pointer should be moved to the end of the current plug-in chain. Thus, if the current request plug-in 730 returns a "LAST" code, the pointer would follow transition 735. According to the foregoing exemplary methods, the plug-in framework would subsequently return a "NEXT" proxylet return code to the proxylet engine. Similarly, if the current response plug-in 770 returns a "LAST" code, the pointer would follow transition 771. Again, according to the foregoing exemplary methods, the plug-in framework would subsequently return a "NEXT" proxylet return code to the proxylet engine.

As noted above, some plug-in response codes may translate to proxylet response codes other than "NEXT." For example, the current request plug-in 730 may return a "RESPOND LAST" code which, following transition 731, would indicate to the proxylet engine that it should move directly to the end of the response proxylet chain (appearing to the plug-in framework and, thus, in the diagram 700 as proceeding directly to sending a response that may have been constructed in the Diameter stack by one or more request plug-ins 720, 730, 740 back to the ingress peer 710). The current request plug-in 730 may also return a "RESPOND FIRST" code which, following transition 736 would indicate that the proxylet engine should move directly to the beginning of the response proxylet chain (appearing to the plug-in framework and, thus, in diagram 700 as proceeding directly to the first plug-in 760 on the response chain). On the response side, the current response plug-in 770 may return a "REDIRECT LAST" code which, following transition 775, would indicate to the proxylet engine that it should move directly to the end of the request proxylet chain (appearing to the plug-in framework and, thus, in the diagram 700 as proceeding directly to sending a request that may have been constructed in the Diameter stack by one or more request plug-ins 760, 770, 780 back to the egress peer 750). The current response plug-in 770 may also return a "REDIRECT FIRST" code which, following transition 772 would indicate that the proxylet engine should move directly to the beginning of the request proxylet chain (appearing to the plug-in framework and, thus, in diagram 700 as proceeding directly to the first plug-in 710 on the request chain).

As noted above, either of the current plug-ins 730, 770 may return a "DROP MESSAGE" code that, following transition 709, results in writing to the /dev/null device file 799 and, therefore, dropping the current message without sending any further messages. Additionally, either current plug-in 730, 770 may return a "SUSPEND" code indicating that the current processing sequence should be suspended. For example, if the current request plug-in 730 returns the "SUSPEND" code, the plug-in framework follows transition 739 to the suspended state 790. Upon resuming execution, a further return code (e.g., a return code received from one or more threads that initiated the resume) may determine to which plug-in execution is returned. For example, a "SAME" code may result in following transition 793 back to the current request plug-in 730 while a "NEXT" code may result in following transition 794 to the next request plug-in 740 in the chain. As a further example, if the current response plug-in 770 returns the "SUSPEND" code, the plug-in framework follows transition 779 to the suspended state 790. Upon resuming execution, a further return code (e.g., a return code received from one or more threads that initiated the resume) may determine to which plug-in execution is returned. For example, a "SAME" code may result in following transition 797 back to the current response plug-in 770 while a "NEXT" code may result in following transition 798 to the next response plug-in 780 in the chain.

It will be understood that while various exemplary values for return codes are described herein (e.g., "NEXT" and "SAME"), the actual values of the return codes will vary by implementation. Thus, a return code may have an alternative textual name than those described herein, may have a numeric value, or may have some other value. Further, various additional or alternative codes and resultant effects on the flow of plug-in or proxylet execution will be apparent.

Figure 8:
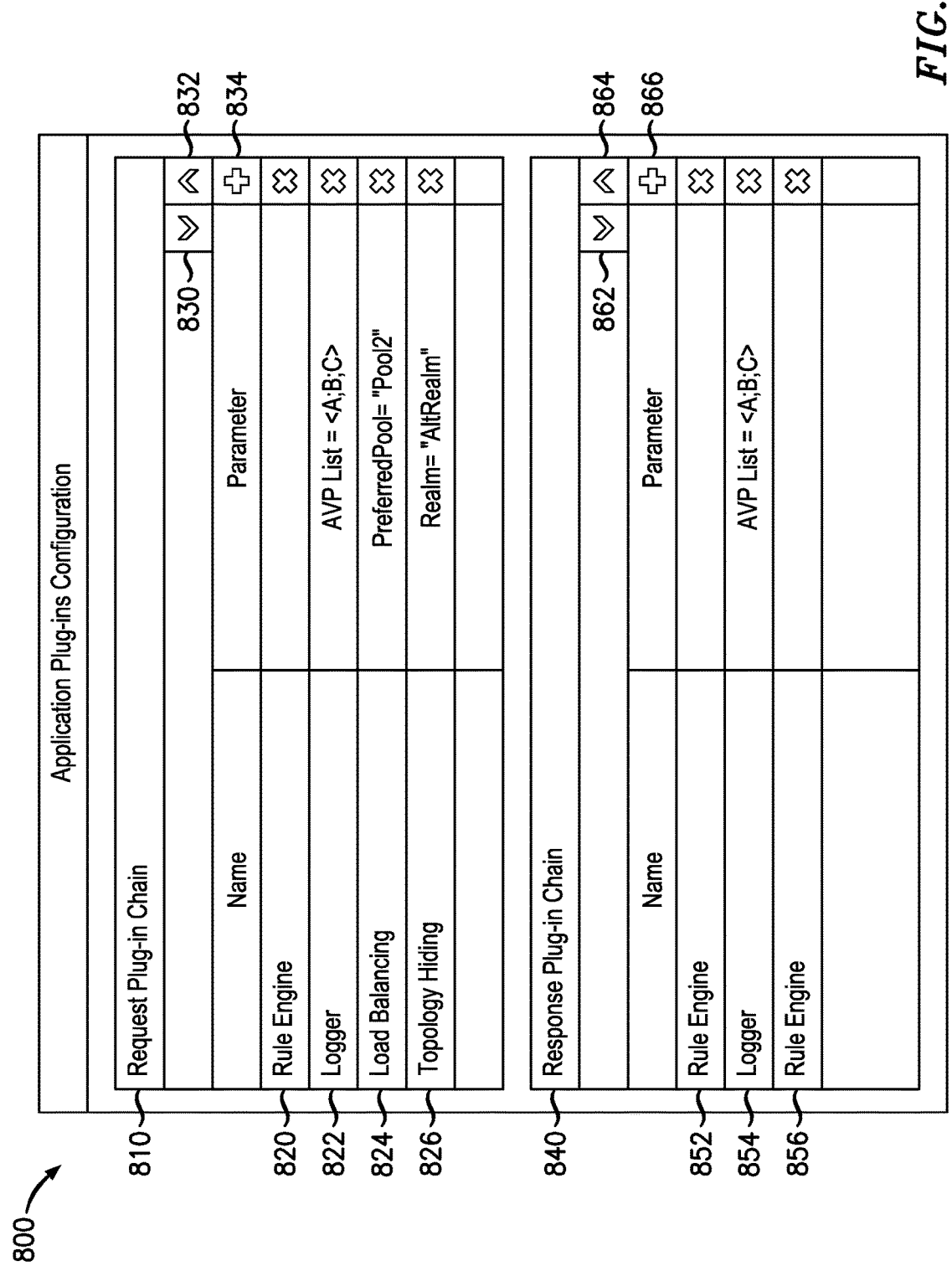
FIG. 8 illustrates an exemplary interface for configuring plug-in chains.

FIG. 8 illustrates an exemplary interface 800 for configuring plug-in chains. In the context of the exemplary hardware 400, the interface 800 may be presented to an operator via a user interface 440 or network interface 450 for configuring the contents of the plug-in chains 474 or plug-ins 476 areas of the storage 460. The interface 800 may be generated according to the GUI instructions 478.

As shown, the interface 800 includes an area for designating a request plug-in chain 810 and an area for designating a response plug-in chain 840. The request plug-in chain is shown as already including four plug-in entries: a rule engine entry 820, a logger entry 822, a load balancing entry 824 and a topology hiding entry 826. Various additional or alternative plug-ins will be apparent. Some of the entries additionally include one or more operator-defined parameters that are to be passed to the plug-in when the plug-in framework traverses the chain 810. Each entry also includes an "X" icon that may be selected to remove the entry from the chain. Down and up arrows 830, 832 are also provided for moving a selected entry 820, 822, 824, 826 down or up, respectively, in the order of the chain 810. A plus button 834 provides the operator to define new entries within the chain by, for example, selecting from a list of known plug-ins or adding a new set of plug-in instructions to those stored for the plug-in framework.

Similar UI elements are provided for the response sequence. As shown, three entries 852, 854, 856 are defined for the response sequence, including two entries that specify the same plug-in 852, 856. Thus, a given plug-in chain may specify that a plug-in should be invoked multiple times, with different or similar parameter sets. In various embodiments, the user interface may require that each invocation of a particular plug-in has a unique parameter set. For example, in some implementations it may become overly complicated for a plug-in to know that it is being invoked for the Nth time while processing is moving through the chain once or whether the chain of plug-ins is being evaluated an Nth time due to a "FIRST" return code from a plug-in. Similar "X", down arrow 862, up arrow 864, and plus buttons 866 are provided for performing functions similar to those described above with respect to the request chain.

According to the foregoing, various embodiments provide a robust framework for enabling an operator to define the operation of a DRA or other device through plug-in instructions without exposing the underlying operation of the device to the operator. For example, by defining the plug-in framework as a proxylet that traverses operator defined plug-in chains, the operator is provided the flexibility of defining device behavior without learning, writing, and reconfiguring the proxylets themselves.

It should be apparent from the foregoing description that various exemplary embodiments of the invention may be implemented in hardware or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a tangible and non-transitory machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A non-transitory machine-readable storage medium encoded with instructions for execution by a Diameter device, the non-transitory machine-readable storage medium comprising:
  instructions for processing a received Diameter message according to a plurality of proxylets; and
  instructions for defining a plug-in framework as a proxylet of the plurality of proxylets, comprising:
    instructions for retrieving a plug-in chain identifying a sequence of plug-ins;
    instructions for determining a current plug-in based on the plug-in chain; and instructions for evaluating plug-in instructions associated with a current plug-in.

2. The non-transitory machine-readable storage medium of claim 1, further comprising:
   instructions for receiving a plug-in result code based on evaluating plug-in instructions,
   wherein the instructions for determining a current plug-in are further based on a previously-received plug-in result code.

3. The non-transitory machine-readable storage medium of claim 2, wherein the instructions for determining a current plug-in comprise:
   instructions for determining that a most recently evaluated plug-in is the current plug-in based on a first plug-in result code;
   instructions for determining that a next plug-in in the sequence of plug-ins in the current plug-in based on a second plug-in result code; and
   instructions for determining that a previous plug-in occurring before the most recently evaluated plug-in in the sequence of plug-ins is the current plug-in based on a third plug-in result code.

4. The non-transitory machine-readable storage medium of claim 2, wherein the instructions for determining a current plug-in comprise:
   instructions for determining that a plug-in identified by the sequence of plug-ins as the first plug-in of the sequence is the current plug-in based on a first plug-in result code.

5. The non-transitory machine-readable storage medium of claim 2, wherein the instructions for determining a current plug-in comprise instructions for determining that no additional plug-ins remain to be evaluated based on a first plug-in result code, whereby any remaining plug-ins in the plug-in chain are skipped.

6. The non-transitory machine-readable storage medium of claim 1, wherein:
   the instructions for retrieving a plug-in chain identifying a sequence of plug-ins comprise:
      instructions for retrieving a first plug-in chain when the received Diameter message is a Diameter request message, and
      instructions for retrieving a second plug-in chain when the received Diameter message is a Diameter response message.

7. The non-transitory machine-readable storage medium of claim 6, further comprising
   instructions for receiving a plug-in result code based on evaluating plug-in instructions,
   wherein the instructions for determining a current plug-in comprise instructions for, based on receiving a first plug-in result code, determining the current plug-in based on an opposite plug-in chain of the first plug-in chain and the second plug-in chain, wherein the opposite plug-in chain is different from the plug-in chain initially selected for processing the received Diameter message by the instructions for retrieving a plug-in chain identifying a sequence of plug-ins.

8. The non-transitory machine-readable storage medium of claim 2, wherein the instructions for defining a plug-in framework further comprise:
   instructions for indicating to the instructions for processing a received Diameter message according to a plurality of proxylets that no further proxylets are to be processed for the received Diameter message based on receiving a first plug-in result code.

9. The non-transitory machine-readable storage medium of claim 1, wherein the instructions for defining a plug-in framework further comprise: instructions for establishing at least one thread pool for executing tasks on behalf of plug-ins.

10. The non-transitory machine-readable storage medium of claim 9, further comprising:
    instructions for receiving a plug-in result code based on evaluating plug-in instructions;
    instructions for suspending execution of the plug-in framework for a received Diameter message based on receiving a first plug-in result code; and
    instructions for resuming execution of the plug-in framework for the received Diameter message based on receiving an indication from the at least one thread pool that execution is to resume.

11. A Diameter device comprising:
    a network interface;
    a storage comprising:
       a plurality of proxylets, including a plug-in framework proxylet,
       a plurality of plug-ins, and
       at least one plug-in chain identifying a sequence of plug-ins; and
    a processor in communication with the network interface and storage, the processor being configured to:
       process a received Diameter message according to the plurality of proxylets; and
       as part of executing the plug-in framework proxylet:
          retrieve a plug-in chain of the at least one plug-in chain;
          determine a current plug-in based on the plug-in chain; and
          evaluate the current plug-in.

12. The Diameter device of claim 11, wherein the processor, in executing the plug-in framework proxylet, is configured to:
    receive a plug-in result code based on evaluating a plug-in,
    wherein the instructions for determining a current plug-in are further based on a previously-received plug-in result code.

13. The Diameter device of claim 12, wherein, in determining a current plug-in, the processor is configured to:
    determine that a most recently evaluated plug-in is the current plug-in based on a first plug-in result code;
    determine that a next plug-in in the sequence of plug-ins in the current plug-in based on a second plug-in result code; and
    determine that a previous plug-in occurring before the most recently evaluated plug-in in the sequence of plug-ins is the current plug-in based on a third plug-in result code.

14. The Diameter device of claim 12, wherein, in determining a current plug-in, the processor is configured to:
    determine that a plug-in identified by the sequence of plug-ins as the first plug-in of the sequence is the current plug-in based on a first plug-in result code.

15. The Diameter device of claim 12, wherein, in determining a current plug-in the processor is configured to determine that no additional plug-ins remain to be evaluated based on a first plug-in result code, whereby any remaining plug-ins in the plug-in chain are skipped.

16. The Diameter device of claim 11, wherein:
    in retrieving a plug-in chain the processor is configured to:

retrieve a first plug-in chain when the received Diameter message is a Diameter request message, and retrieve a second plug-in chain when the received Diameter message is a Diameter response message.

17. The Diameter device of claim 16, wherein the processor, in executing the plug-in framework proxylet, is configured to receive a plug-in result code based on evaluating a plug-in, and in determining a current plug-in, configured to, based on receiving a first plug-in result code, determine the current plug-in based on an opposite plug-in chain of the first plug-in chain and the second plug-in chain, wherein the opposite plug-in chain is different from the plug-in chain initially selected for processing the received Diameter message by the instructions for retrieving a plug-in chain identifying a sequence of plug-ins.

18. The Diameter device of claim 12, wherein the processor, in executing the plug-in framework proxylet, is further configured to:

determine that no further proxylets are to be processed for the received Diameter message based on receiving a first plug-in result code.

19. The Diameter device of claim 11, wherein the processor, in executing the plug-in framework proxylet, is further configured to establish at least one thread pool for executing tasks on behalf of plug-ins.

20. The Diameter device of claim 19, wherein the processor, in executing the plug-in framework proxylet, is configured to receive a plug-in result code based on evaluating a plug-in, and in executing the plug-in framework proxylet, is configured to:

suspend execution of the plug-in framework for a received Diameter message based on receiving a first plug-in result code; and resume execution of the plug-in framework for the received Diameter message based on receiving an indication from the at least one thread pool that execution is to resume.

* * * * *